(12) United States Patent
Xu et al.

(10) Patent No.: US 11,266,949 B2
(45) Date of Patent: Mar. 8, 2022

(54) DEVICE FOR TESTING PERFORMANCE OF PHOTOCATALYTIC OZONATION IN DEGRADATION OF VOLATILE ORGANIC COMPOUNDS AND METHOD OF OPERATING SAME

(71) Applicant: YANCHENG INSTITUTE OF TECHNOLOGY, Jiangsu (CN)

(72) Inventors: Qi Xu, Jiangsu (CN); Bailin Wang, Jiangsu (CN); Dongbin Chen, Jiangsu (CN); Feng Cheng, Jiangsu (CN)

(73) Assignee: YANCHENG INSTITUTE OF TECHNOLOGY, Yancheng (CN)

( * ) Notice: Subject to any disclaimer, the term of this patent is extended or adjusted under 35 U.S.C. 154(b) by 0 days.

(21) Appl. No.: 17/152,137

(22) Filed: Jan. 19, 2021

(65) Prior Publication Data
US 2021/0402350 A1 Dec. 30, 2021

(30) Foreign Application Priority Data
Jun. 29, 2020 (CN) .......................... 202010608398.2

(51) Int. Cl.
*B01D 53/76* (2006.01)
*G01N 30/02* (2006.01)

(52) U.S. Cl.
CPC ............ *B01D 53/76* (2013.01); *G01N 30/02* (2013.01); *B01D 2251/104* (2013.01); *B01D 2255/20753* (2013.01); *B01D 2255/802* (2013.01); *B01D 2256/22* (2013.01); *B01D 2256/245* (2013.01); *B01D 2257/708* (2013.01); *B01D 2259/804* (2013.01)

(58) Field of Classification Search
CPC ........ A61L 9/20; A61L 9/205; A61L 2209/10; A61L 2209/212; B01D 53/72; B01D 53/8687; B01D 2251/104; B01D 2257/704; B01D 2257/708; B01D 2258/06; B01J 19/123; B01J 2219/0875; B01J 2219/08; A62D 3/10; A62D 3/176; A62D 3/30; A62D 2101/20; A62D 2203/10
See application file for complete search history.

(56) References Cited

U.S. PATENT DOCUMENTS

| 4,941,957 A * | 7/1990 | Zeff | ....................... B01J 19/123 |
| | | | 204/157.3 |
| 2021/0170063 A1* | 6/2021 | Benedek | ................... A61L 9/12 |

FOREIGN PATENT DOCUMENTS

| CN | 207591619 U | 7/2018 |
| CN | 110174475 A | 8/2019 |
| CN | 111001295 A | 4/2020 |

* cited by examiner

*Primary Examiner* — Timothy C Vanoy
(74) *Attorney, Agent, or Firm* — Wayne IP LLC

(57) ABSTRACT

A device for testing performance of photocatalytic ozonation in degradation of volatile organic compounds. The device includes an air generator, an oxygen cylinder, a volatile organic compound cylinder, a mass flow meter, an ozone generator, a humidifier, a thermohygrometer, a gas mixer, a light source, a plate-type reactor, an ozone analyzer, a gas chromatographic instrument, a first valve, a second valve, a third valve and a tail gas treatment unit; The experimental device of the present invention is suitable for the experiment of photocatalytic degradation of volatile organic gases in mixed gas, and has the advantages of wide experimental conditions, simple structure, convenient use, reliable performance, etc.

6 Claims, 1 Drawing Sheet

DEVICE FOR TESTING PERFORMANCE OF PHOTOCATALYTIC OZONATION IN DEGRADATION OF VOLATILE ORGANIC COMPOUNDS AND METHOD OF OPERATING SAME

CROSS-REFERENCE TO RELATED APPLICATIONS

This application claims the benefit of priority from Chinese Patent Application No. 202010608398.2, filed on Jun. 29, 2020. The content of the aforementioned application, including any intervening amendments thereto, is incorporated herein by reference in its entirety.

TECHNICAL FIELD

This application relates to experimental chemistry, and more particularly to a device for testing performance of photocatalytic ozonation in degradation of volatile organic compounds and a method of operating the same.

BACKGROUND

The industrial production and daily use of organic solvents, such as diluter, degreasant, detergent, lubricant and liquid fuel, lead to the production of volatile organic compounds. There are a great variety of volatile organic compounds, and some of them has high chemical reactivity, and may undergo a photochemical reaction with primary pollutants, such as nitrogen oxides ($NO_x$) and disulfides (R—S—S—R'), under a certain condition to produce some secondary pollutants with strong oxidizing property, such as ozone, aldehydes, ketones and particulate pollutants. These secondary pollutants are more harmful than the primary pollutants. Moreover, most of the volatile organic compounds are irritating and toxic and a few are carcinogenic, so humans and other organisms may suffer temporary or permanent blood, organ and nerve injury after absorbing these volatile organic compounds through respiratory tracts and skins. Therefore, it is of great significance to develop a method of effectively removing the volatile organic compounds to achieve the harmless treatment.

Currently, the volatile organic compounds are treated mainly by condensation, adsorption, biodegradation, thermal combustion, plasma and photocatalysis, while these methods generally struggle with high energy consumption and secondary pollution. Among them, the photocatalysis is recognized as the most promising tool for removing the volatile organic compounds. However, the volatile organic compounds and intermediate products absorbed on the catalyst surface will attenuate the catalytic activity in the photocatalytic decomposition, resulting in a reduced catalytic efficiency. Interestingly, the combination of the photocatalysis with ozonation can effectively enhance the decomposition and mineralization of the volatile organic compounds since the decomposition of ozone will produce some active substances capable of promoting the decomposition of volatile organic compounds and intermediate products adsorbed on the catalyst surface.

In order to better treat the volatile organic compounds, scientifically and effectively study the performance of photocatalytic ozonation to degrade the volatile organic compounds and reduce production cost, it is urgently required to design and develop a device for testing performance of the photocatalytic ozonation in degradation of the volatile organic compounds.

SUMMARY

In view of the defects in the prior art, an object of this application is to provide a device for testing performance of photocatalytic ozonation in degradation of volatile organic compounds and a method of operating the same, where the device is suitable for evaluating the performance of the photocatalytic ozonation in the degradation of the volatile organic compounds in a laboratory level and a production level. Moreover, the device provided herein adopts a method for the experiment, and has the advantages of continuous injection, wide experimental condition, simple structure, easy operation and reliable performance.

Technical solutions of this disclosure are described as follows.

In a first aspect, this disclosure provides a device for testing performance of photocatalytic ozonation in degradation of volatile organic compounds, comprising:
an air generator;
an oxygen cylinder;
a volatile organic compound cylinder;
a mass flow meter;
an ozone generator;
a humidifier;
a thermohygrometer;
a gas mixer;
a light source;
a plate-type reactor;
an ozone analyzer;
a gas chromatographic instrument;
a first valve;
a second valve;
a third valve; and
a tail gas treatment unit;
wherein the air generator is communicated with the humidifier through a first pipeline to allow air stored in the air generator to enter the humidifier;
the humidifier is configured to humidify the air entering the humidifier, and the humidifier is connected to the gas mixer to allow air humidified by the humidifier to enter the gas mixer;
the air generator is communicated with the gas mixer through a second pipeline to enable the air stored in the air generator to enter the gas mixer;
the oxygen cylinder is communicated with the ozone generator through a third pipeline to allow oxygen in the oxygen cylinder to enter the ozone generator;
the ozone generator is configured to apply an electric shock to the oxygen entering the ozone generator to generate ozone, and the ozone generator is connected to the gas mixer to allow the ozone generated in the ozone generator to enter the gas mixer;
the volatile organic compound cylinder is communicated with the gas mixer through a fourth pipeline to allow a volatile organic compound in the volatile organic compound cylinder to enter the gas mixer;
the first pipeline, the second pipeline, the third pipeline and the fourth pipeline are separately arranged, and the gas mixer is configured to proportionally mix air, the volatile organic compound and ozone therein;
the first pipeline, the second pipeline, the third pipeline and the fourth pipeline are provided with the mass flow meter, respectively; and the mass flow meter is configured to control a flow rate of the air, the volatile organic compound and the ozone into the gas mixer;
the thermohygrometer is provided in the gas mixer, and is configured to detect temperature and humidity of a mixed gas composed of air, the volatile organic compound and ozone in the gas mixer in real time;

the gas mixer is connected to the plate-type reactor through a fifth pipeline; the plate-type reactor is configured to provide a place for degradation of the volatile organic compound by photocatalytic ozonation; and the first valve is provided on the fifth pipeline to control the communication between the gas mixer and the plate-type reactor;

the light source is provided on the plate-type reactor;

the plate-type reactor is communicated with the ozone analyzer and the gas chromatographic instrument, respectively;

the ozone analyzer is configured to detect a concentration of ozone in the plate-type reactor, and the gas chromatographic instrument is configured to isolate individual components of a mixed gas in the plate-type reactor and detect a concentration of individual components of the mixed gas in the plate-type reactor;

the plate-type reactor is also connected to the tail gas treatment unit through the third valve, and the third valve is configured to control communication between the plate-type reactor and the tail gas treatment unit, communication between the ozone analyzer and the tail gas treatment unit and communication between the gas chromatographic instrument and the tail gas treatment unit;

the gas mixer bypasses the plate-type reactor and is communicated with the ozone analyzer and the gas chromatographic instrument through a sixth pipeline and the second valve, respectively;

the second valve is configured to control communication of the gas mixer with the ozone analyzer and the gas chromatographic instrument;

the ozone analyzer is also configured to monitor a concentration of ozone in the gas mixer, and the gas chromatographic instrument is also configured to isolate individual components of a mixed gas in the gas mixer and detect a concentration of individual components of the mixed gas in the gas mixer; and the gas mixer is connected to the tail gas treatment unit through the second valve and the third valve, and the tail gas treatment unit is configured to purify a tail gas produced from the degradation of the mixed gas in the plate-type reactor.

In an embodiment, the light source is ultraviolet light or visible light.

In an embodiment, the first, second, third, fourth, fifth and sixth pipelines are all made of polytetrafluoroethylene.

In an embodiment, the plate-type reactor is provided with quartz glass beads; and a catalyst used in the photocatalytic ozonation is distributed on surfaces of the quartz glass beads to increase contact areas between the catalyst and the volatile organic compound and between the catalyst and ozone.

In an embodiment, the gas chromatographic instrument is equipped with a flame ionization monitor (FID) and a nickel catalyst converter; the nickel catalyst converter is configured to convert carbon monoxide and carbon dioxide generated from the degradation of the volatile organic compound into methane; and the FID is used to determine a content of the methane, so as to further calculate concentrations of the carbon monoxide and the carbon dioxide.

In a second aspect, this application further provides a method of operating the above device, comprising:

(1) feeding a part of air in the air generator and the volatile organic compound stored in the volatile organic compound cylinder into the gas mixer through the second and fourth pipelines; feeding another part of air in the air generator into the humidifier for humidification; feeding oxygen in the oxygen cylinder into the ozone generator to produce ozone under the action of electric shock; feeding the ozone and the air flowing out of the humidifier into the gas mixer through pipelines; and mixing air, the volatile organic compound and ozone in proportion in the gas mixer, where a temperature and humidity of the mixed gas in the gas mixer are monitored by the thermohygrometer in real time; feeding the mixed gas in the gas mixer into the plate-type reactor; and turning on the light source to illuminate the plate-type reactor, to perform the photocatalytic ozonation; and (2) feeding a mixed gas in the plate-type reactor into the ozone analyzer and the gas chromatographic instrument through pipelines, where the ozone analyzer is used to monitor a concentration of ozone before and after the photocatalytic ozonation, and the gas chromatographic instrument is used to monitor a concentration of the volatile organic compound before and after the photocatalytic ozonation and concentrations of the produced carbon monoxide and carbon dioxide; after the photocatalytic ozonation is completed, feeding a mixed gas in the plate-type reactor to the tail gas treatment unit for processing; and discharging a gas processed by the tail gas treatment unit to atmosphere.

Compared to the prior art, this application has the following beneficial effects.

In the device provided herein, the pipelines are all made of polytetrafluoroethylene with light weight, high strength and excellent anti-oxidation, anti-corrosion and anti-adsorption performances. In addition, the plate-type reactor is provided with quartz glass beads, which have high temperature resistance, anti-corrosion performance and high transparency. Through the above improvements, the device can monitor the effect of the photocatalytic ozonation on the degradation of the volatile organic compound under different humidity, volatile organic gas concentrations, light intensity and ozone concentrations, providing theoretical and experimental basis for the research and development of an effective catalyst for industrial removal of volatile organic compounds.

Figure 1:
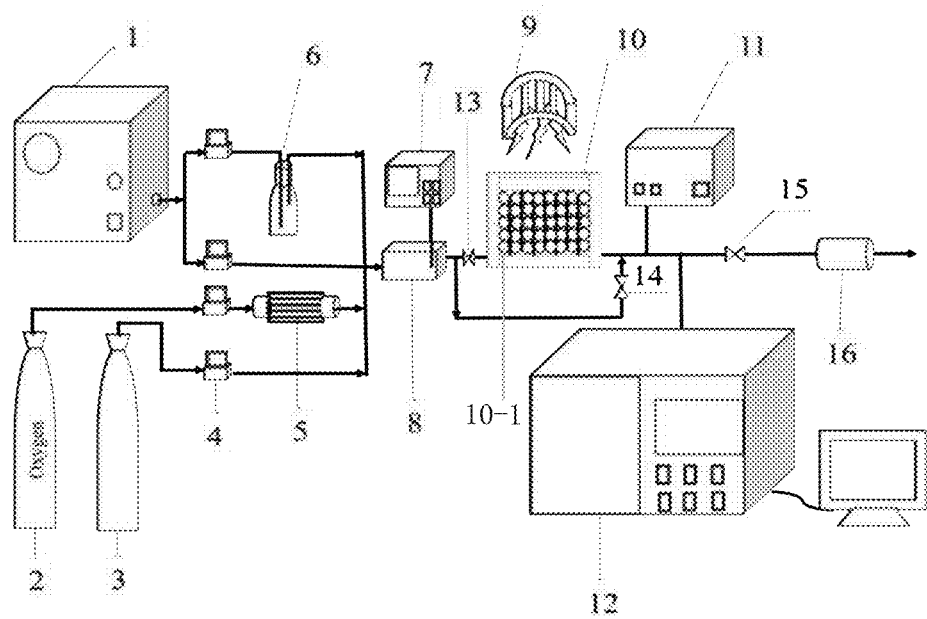
FIG. 1 is a schematic diagram of a device for testing performance of photocatalytic ozonation in degradation of volatile organic compounds according to an embodiment of this disclosure.

In the drawing, 1, air generator; 2, oxygen cylinder; 3, volatile organic compound cylinder; 4, mass flow meter; 5, ozone generator; 6, humidifier; 7, thermohygrometer; 8, gas mixer; 9, light source; 10, plate-type reactor; 10-1, quartz glass bead; 11, ozone analyzer; 12, gas chromatographic instrument; 13, first valve; 14, second valve; 15, third valve; and 16, tail gas treatment unit.

DETAILED DESCRIPTION OF EMBODIMENTS

This disclosure will be further described in detail below with reference to the embodiments. It should be understood by those skilled in the art that these embodiments are merely illustrative of the disclosure, and are not intended to limit the disclosure. Unless otherwise specified, the operation in the embodiments is performed using conventional techniques or conditions, and the reagents or instruments used herein are commercially available.

Embodiment 1

As shown in the FIG. 1, this disclosure provides a device for testing performance of photocatalytic ozonation in degradation of volatile organic compounds, including:

an air generator 1, an oxygen cylinder 2, a volatile organic compound cylinder 3, a mass flow meter 4, an ozone generator 5, a humidifier 6, a thermohygrometer 7, a gas mixer 8, a light source 9, a plate-type reactor 10, an ozone analyzer 11, a gas chromatographic instrument 12, a first valve 13, a second valve 14, a third valve 15 and a tail gas treatment unit 16.

The air generator 1 is communicated with the humidifier 6 through a first pipeline to allow air stored in the air generator 1 to enter the humidifier 6. The humidifier 6 is configured to humidify the air entering the humidifier 6, and the humidifier 6 is connected to the gas mixer 8 to allow air humidified by the humidifier 6 to enter the gas mixer 8. The air generator 1 is communicated with the gas mixer 8 through a second pipeline to enable the air stored in the air generator 1 to enter the gas mixer 8. The oxygen cylinder 2 is communicated with the ozone generator 5 through a third pipeline to allow oxygen in the oxygen cylinder 2 to enter the ozone generator 5. The ozone generator 5 is configured to apply an electric shock to the oxygen entering the ozone generator 5 to generate ozone, and the ozone generator 5 is connected to the gas mixer 8 to allow the ozone generated in the ozone generator 5 to enter the gas mixer 8. The volatile organic compound cylinder 3 is communicated with the gas mixer 8 through a fourth pipeline to allow a volatile organic compound in the volatile organic compound cylinder 3 to enter the gas mixer 8. The first pipeline, the second pipeline, the third pipeline and the fourth pipeline are separately arranged, and the gas mixer 8 is configured to proportionally mix air, the volatile organic compound and ozone therein. The first pipeline, the second pipeline, the third pipeline and the fourth pipeline are provided with the mass flow meter 4, respectively. The mass flow meter 4 is configured to control a flow rate of the air, the volatile organic compound and the ozone into the gas mixer 8.

The thermohygrometer 7 is provided in the gas mixer 8, and is configured to detect temperature and humidity of a mixed gas composed of air, the volatile organic compound and ozone in the gas mixer 8 in real time. The gas mixer 8 is connected to the plate-type reactor 10 through a fifth pipeline. The plate-type reactor 10 is configured to provide a place for degradation of the volatile organic compound by photocatalytic ozonation. The first valve 13 is provided on the fifth pipeline to control the communication between the gas mixer 8 and the plate-type reactor 10.

The light source 9 is provided on the plate-type reactor 10. The plate-type reactor 10 is communicated with the ozone analyzer 11 and the gas chromatographic instrument 12, respectively.

The ozone analyzer 11 is configured to detect a concentration of ozone in the plate-type reactor 10, and the gas chromatographic instrument 12 is configured to isolate individual components of a mixed gas in the plate-type reactor 10 and detect a concentration of individual components of the mixed gas in the plate-type reactor 10. The plate-type reactor 10 is also connected to the tail gas treatment unit 16 through the third valve 15, and the third valve 15 is configured to control communication between the plate-type reactor 10 and the tail gas treatment unit 16, communication between the ozone analyzer 11 and the tail gas treatment unit 16 and communication between the gas chromatographic instrument 12 and the tail gas treatment unit 16.

The gas mixer 8 bypasses the plate-type reactor 10 and is communicated with the ozone analyzer 11 and the gas chromatographic instrument 12 through a sixth pipeline and the second valve 14, respectively.

The second valve 14 is configured to control communication of the gas mixer 8 with the ozone analyzer 11 and the gas chromatographic instrument 12. The ozone analyzer 11 is also configured to monitor a concentration of ozone in the gas mixer 8, and the gas chromatographic instrument 12 is also configured to isolate individual components of a mixed gas in the gas mixer 8 and detect a concentration of individual components of the mixed gas in the gas mixer 8. The gas mixer 8 is connected to the tail gas treatment unit 16 through the second valve 14 and the third valve 15, and the tail gas treatment unit 16 is configured to purify a tail gas produced from the degradation of the mixed gas in the plate-type reactor 10.

The gas chromatographic instrument 12 is equipped with a FID and a nickel catalyst converter. The nickel catalyst converter is configured to convert carbon monoxide and carbon dioxide generated from the degradation of the volatile organic compound into methane. The FID is used to determine a content of the methane, so as to further calculate concentrations of the carbon monoxide and the carbon dioxide.

A method of operating the above device is described as follows.

(1) A part of air in the air generator 1 and the volatile organic compound stored in the volatile organic compound cylinder 3 are fed into the gas mixer 8 through the second and fourth pipelines. Another part of air in the air generator 1 is fed into the humidifier 6 for humidification. Oxygen in the oxygen cylinder 2 is fed into the ozone generator 5 to produce ozone under the action of electric shock. The ozone and the air flowing out of the humidifier 6 are fed into the gas mixer 8 through pipelines. Air, the volatile organic compound and ozone in the gas mixer 8 are mixed in proportion, where a temperature and humidity of the mixed gas in the gas mixer 8 are monitored by the thermohygrometer 7 in real time. The mixed gas in the gas mixer 8 is fed into the plate-type reactor 10. The light source 9 is turned on to illuminate the plate-type reactor 10 to perform the photocatalytic ozonation, where the light source 9 is ultraviolet light (185-256 nm) or visible light.

(2) A mixed gas in the plate-type reactor 10 is fed into the ozone analyzer 11 and the gas chromatographic instrument 12 through pipelines, where the ozone analyzer 11 is used to monitor a concentration of ozone before and after the photocatalytic ozonation, and the gas chromatographic instrument 12 is used to monitor a concentration of the volatile organic compound before and after the photocatalytic ozonation and concentrations of the produced carbon monoxide and carbon dioxide. After the photocatalytic ozonation is completed, a mixed gas in the plate-type reactor 10 is fed into the tail gas treatment unit 16 for processing. Then the gas processed by the tail gas treatment unit 16 is discharged to atmosphere.

The mass flow meter 4 is used to control flow rates of individual gas components into the gas mixer 8 to obtain multiple gas mixtures varying in concentrations of the volatile organic compound, ozone and air, so as to investigate the performance of the photocatalytic ozonation for the degradation of the volatile organic compound under different gas compositions in the plate-type reactor 10 loaded with the catalyst. The ozone analyzer 11 and the gas chromatographic instrument 12 can respectively detect concentrations of ozone and the volatile organic compound in the mixed gas treated by the plate-type reactor 10 to evaluate the performance of the catalyst, providing theoretical reference for the improvement of the degradation of volatile organic compounds by photocatalytic ozonation in the future.

The humidifier 6 can adjust the humidity of air to enable the mixed gas entering the plate-type reactor 10 to have different humidity. Then the mixed gas treated by the plate-type reactor 10 under different humidity is analyzed for the content of the volatile organic compound to determine the optimal humidity, providing theoretical basis for the research and development of the catalysts used in the industrial photocatalytic ozonation.

The plate-type reactor 10 is provided with quartz glass beads 10-1, on which the catalyst is dispersed, which allows for a larger contact area of the catalyst with the volatile organic compound and ozone, allowing for enhanced catalytic performance. In addition, it is convenient to adjust the amount of the catalyst according to the actual need.

In order to facilitate monitoring the volatile organic compound content, the ozone content and the treatment effect of the plate-type reactor 10, a sampling port is provided between the plate-type reactor 10 and the tail gas treatment unit 16, and the third valve 15 is closed to allow the untreated mixed gas to enter the ozone analyzer 11 and the gas chromatographic instrument 12, obtaining the initial ozone and volatile organic compound contents. After the photocatalytic ozonation is completed, the treated gas mixture is determined by the ozone analyzer 11 and the gas chromatographic instrument 12 for the residual ozone level and the concentration of the intermediate products from the degradation of the volatile organic compound, respectively. Based on the above arrangement, it is convenient to evaluate the removal performance against the volatile organic compound, so that the device provided herein is suitable for the industrial application.

The device provided herein can be used in laboratory and industry. In the industrial production, the volatile organic compounds are derived from the waste gas discharged by factories and the ozone can be produced from air under the action of electric shock. Generally, the device is experimentally used, and in this case, the ozone is produced by the ozone generator 5 and the volatile organic compound is a single volatile organic compound or a mixture of multiple volatile organic compounds and air in different proportions.

The main body of the device and the pipelines are all made of polytetrafluoroethylene with light weight, high strength and excellent anti-oxidation, anti-corrosion and anti-adsorption performances. In addition, the plate-type reactor 10 is provided with the quartz glass beads 10-1, which can resist high temperature and corrosion, and have a high transparency.

The device provided herein can test the performance of the photocatalytic ozonation for the degradation of methylbenzene at room temperature under different humidity, methylbenzene and ozone concentrations, providing a theoretical basis for the industrial degradation of methylbenzene by photocatalytic ozonation.

The above-mentioned embodiments are merely used to further describe the purpose, technical solutions and beneficial effects of this disclosure in detail. It should be understood that the above are only preferred embodiments of this application, and are not intended to limit this application. Any modification, replacement and improvement made without departing from the spirit of this application shall fall within the scope of this application.

What is claimed is:

1. A device for testing performance of photocatalytic ozonation in degradation of volatile organic compounds, comprising:
    an air generator;
    an oxygen cylinder;
    a volatile organic compound cylinder;
    a mass flow meter;
    an ozone generator;
    a humidifier;
    a thermohygrometer;
    a gas mixer;
    a light source;
    a plate-type reactor;
    an ozone analyzer;
    a gas chromatographic instrument;
    a first valve;
    a second valve;
    a third valve; and
    a tail gas treatment unit;
    wherein the air generator is communicated with the humidifier through a first pipeline to allow air stored in the air generator to enter the humidifier;
    the humidifier is configured to humidify the air entering the humidifier, and the humidifier is connected to the gas mixer to allow air humidified by the humidifier to enter the gas mixer;
    the air generator is communicated with the gas mixer through a second pipeline to enable the air stored in the air generator to enter the gas mixer;
    the oxygen cylinder is communicated with the ozone generator through a third pipeline to allow oxygen in the oxygen cylinder to enter the ozone generator;
    the ozone generator is configured to apply an electric shock to the oxygen entering the ozone generator to generate ozone, and the ozone generator is connected to the gas mixer to allow the ozone generated in the ozone generator to enter the gas mixer;
    the volatile organic compound cylinder is communicated with the gas mixer through a fourth pipeline to allow a volatile organic compound in the volatile organic compound cylinder to enter the gas mixer;
    the first pipeline, the second pipeline, the third pipeline and the fourth pipeline are separately arranged, and the gas mixer is configured to proportionally mix air, the volatile organic compound and ozone therein;
    the first pipeline, the second pipeline, the third pipeline and the fourth pipeline are provided with the mass flow meter, respectively; and the mass flow meter is configured to control a flow rate of the air, the volatile organic compound and the ozone into the gas mixer;
    the thermohygrometer is provided in the gas mixer, and is configured to detect temperature and humidity of a mixed gas composed of air, the volatile organic compound and ozone in the gas mixer in real time;
    the gas mixer is connected to the plate-type reactor through a fifth pipeline; the plate-type reactor is configured to provide a place for degradation of the volatile organic compound by photocatalytic ozonation; and the first valve is provided on the fifth pipeline to control the communication between the gas mixer and the plate-type reactor;
    the light source is provided on the plate-type reactor;
    the plate-type reactor is communicated with the ozone analyzer and the gas chromatographic instrument, respectively;
    the ozone analyzer is configured to detect a concentration of ozone in the plate-type reactor, and the gas chromatographic instrument is configured to isolate individual components of a mixed gas in the plate-type reactor and detect a concentration of individual components of the mixed gas in the plate-type reactor;

the plate-type reactor is also connected to the tail gas treatment unit through the third valve, and the third valve is configured to control communication between the plate-type reactor and the tail gas treatment unit, communication between the ozone analyzer and the tail gas treatment unit and communication between the gas chromatographic instrument and the tail gas treatment unit;

the gas mixer bypasses the plate-type reactor and is communicated with the ozone analyzer and the gas chromatographic instrument through a sixth pipeline and the second valve, respectively;

the second valve is configured to control communication of the gas mixer with the ozone analyzer and the gas chromatographic instrument;

the ozone analyzer is also configured to monitor a concentration of ozone in the gas mixer, and the gas chromatographic instrument is also configured to isolate individual components of a mixed gas in the gas mixer and detect a concentration of individual components of the mixed gas in the gas mixer; and the gas mixer is connected to the tail gas treatment unit through the second valve and the third valve, and the tail gas treatment unit is configured to purify a tail gas produced from the degradation of the mixed gas in the plate-type reactor.

2. The device of claim 1, wherein the light source is ultraviolet light or visible light.

3. The device of claim 1, wherein the first, second, third, fourth, fifth and sixth pipelines are all made of polytetrafluoroethylene.

4. The device of claim 1, wherein the plate-type reactor is provided with quartz glass beads; and a catalyst used in the photocatalytic ozonation is distributed on surfaces of the quartz glass beads to increase contact areas between the catalyst and the volatile organic compound and between the catalyst and ozone.

5. The device of claim 1, wherein the gas chromatographic instrument is equipped with a flame ionization monitor (FID) and a nickel catalyst converter; the nickel catalyst converter is configured to convert carbon monoxide and carbon dioxide generated from the degradation of the volatile organic compound into methane; and the FID is used to determine a content of the methane, so as to further calculate concentrations of the carbon monoxide and the carbon dioxide.

6. A method of operating the device of claim 1, comprising:

(1) feeding a part of air in the air generator and the volatile organic compound stored in the volatile organic compound cylinder into the gas mixer through the second and fourth pipelines; feeding another part of air in the air generator into the humidifier for humidification; feeding oxygen in the oxygen cylinder into the ozone generator to produce ozone under the action of electric shock; feeding the ozone and the air flowing out of the humidifier into the gas mixer through pipelines; and mixing air, the volatile organic compound and ozone in proportion in the gas mixer, where a temperature and humidity of the mixed gas in the gas mixer are monitored by the thermohygrometer in real time; feeding the mixed gas in the gas mixer into the plate-type reactor; and turning on the light source to illuminate the plate-type reactor, to perform the photocatalytic ozonation; and (2) feeding a mixed gas in the plate-type reactor into the ozone analyzer and the gas chromatographic instrument through pipelines, where the ozone analyzer is used to monitor a concentration of ozone before and after the photocatalytic ozonation, and the gas chromatographic instrument is used to monitor a concentration of the volatile organic compound before and after the photocatalytic ozonation and concentrations of the produced carbon monoxide and carbon dioxide; after the photocatalytic ozonation is completed, feeding a mixed gas in the plate-type reactor to the tail gas treatment unit for processing; and discharging a gas processed by the tail gas treatment unit to atmosphere.

* * * * *